United States Patent
Haley et al.

(10) Patent No.: US 9,563,903 B1
(45) Date of Patent: *Feb. 7, 2017

(54) SYSTEM AND METHOD FOR CONTROLLING REAL-TIME BIDDING FOR ONLINE ADVERTISEMENTS

(71) Applicant: MaxPoint Interactive, Inc., Morrisville, NC (US)

(72) Inventors: Ben Haley, Austin, TX (US); Michael Els, Durham, NC (US); Damien Harris, Austin, TX (US); Chris Farmer, Austin, TX (US)

(73) Assignee: MaxPoint Interactive, Inc., Morrisville, NC (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/670,448

(22) Filed: Nov. 6, 2012

Related U.S. Application Data

(63) Continuation of application No. 13/565,710, filed on Aug. 2, 2012, now abandoned.

(51) Int. Cl.
*G06Q 30/00* (2012.01)
*G06Q 30/02* (2012.01)

(52) U.S. Cl.
CPC ...... *G06Q 30/0242* (2013.01); *G06Q 30/0244* (2013.01); *G06Q 30/0246* (2013.01)

(58) Field of Classification Search
None
See application file for complete search history.

(56) References Cited

U.S. PATENT DOCUMENTS

| | | | |
|---|---|---|---|
| 7,231,358 B2* | 6/2007 | Singh | G06F 17/30864 705/14.46 |
| 2006/0212350 A1* | 9/2006 | Ellis | G06Q 30/0242 705/14.41 |
| 2007/0162621 A1 | 7/2007 | Condorelli et al. | 710/1 |
| 2008/0319890 A1* | 12/2008 | Urbanski et al. | 705/37 |
| 2012/0041816 A1* | 2/2012 | Buchalter | G06Q 30/02 705/14.41 |
| 2014/0040015 A1 | 2/2014 | Haley et al. | 705/14.45 |

OTHER PUBLICATIONS

United States Non-Final Office Action, U.S. Appl. No. 13/565,710, 12 pages, Jun. 13, 2013.
United States Final Office Action, U.S. Appl. No. 13/750,960, 20 pages, May 7, 2015.
United States Non-Final Office Action, U.S. Appl. No. 13/750,960, 21 pages, Nov. 26, 2014.
United States Non-Final Office Action, U.S. Appl. No. 13/750,960, 10 pages, Mar. 21, 2016.

* cited by examiner

*Primary Examiner* — Matthew T. Sittner
*Assistant Examiner* — Richard Reinhardt
(74) *Attorney, Agent, or Firm* — Slayden Grubert Beard PLLC

(57) ABSTRACT

A method and system for controlling real-time bidding for online advertisements is disclosed. According to one embodiment, a computer-implemented method comprises receiving a real-time bidding (RTB) request from a bidder. The RTB request contains a campaign target. An online advertisement campaign corresponding to the RTB request is placed. Campaign performance data is received from an impression server and/or an event server. The campaign performance data is compared to the campaign target. Based on the result of comparison, it is determined whether to enable or disable the online advertisement campaign.

18 Claims, 3 Drawing Sheets

SYSTEM AND METHOD FOR CONTROLLING REAL-TIME BIDDING FOR ONLINE ADVERTISEMENTS

The present application claims the benefit of and priority to U.S. Non-Provisional patent application Ser. No. 13/565,710 filed on Aug. 2, 2012 and is hereby incorporated by reference.

FIELD

The present disclosure relates in general to the field of bidding on advertisement impressions and events, and in particular, to a system and method controlling real-time bidding for online advertisements.

BACKGROUND

An online advertisement impression generally refers to the slot or space on the pages of a website that are available for displaying a single view of an advertisement along with its content. An advertisement event generally refers to active or passive actions that users take in response to an advertisement impression such as clicking an image, expanding an advertisement, or watching a video. Advertisers typically purchase advertisement impressions through bulk contracts directly with publishers. More recently, individual and targeted impressions have become available through real-time bidding (RTB) exchanges such as AdX, Admeld, Pubmatic, Rubicon, etc.

RTB advertising companies are contracted to deliver targeted quantities of advertisements over a period of time. For example, a contract may specify that 3,000,000 advertisements are to be displayed over a 30 day period. Alternatively, the contract may specify some number of events such as 100,000 clicks on the advertisement impressions over the period of time. In a simple scenario, these advertisement impressions are distributed evenly over the 30 day period resulting in a target of 100,000 impressions of that advertisement campaign each day. While many RTB exchanges can meet that requirement, there are other constraints, for example, expandable advertisements are not supported on all web sites or the site may not allow video advertisements longer than 15 seconds. Advertisers may want their advertisement to be displayed on the banner at the top of the page or supply only a few sizes of advertisements, thus limiting the inventory flexibility. Advertisers may also want to protect their brand by restricting the sites where the advertisements are shown. With these restrictions, RTB advertisers examine a vast number of potential impressions to find opportunities to deliver the advertisements.

Once an opportunity is located, an auction takes place with no guarantee that the ad will be purchased. There is no guarantee that similar opportunities will be offered in the future. The selected web sites could become unavailable, layout changes could alter the ad sizes supported, or another company could purchase the available inventory on a domain; therefore, impressions should be located and purchased when available. To handle large advertising campaigns in this uncertain environment, RTB advertisers integrate with multiple RTB exchanges, each of which may host auctions in multiple locations. This results in a continuous stream of impression opportunities at a rate of tens or hundreds of thousands per second. To deal with this flood of bidding opportunities, a geographically distributed set of servers is required to meet the time and scale requirements as described below.

Typical RTB exchanges conduct many thousands of auctions per second. Each auction is a candidate for multiple advertising campaigns. The bidder must determine which campaign, if any, is the best match for the auction. For organizations examining a large fraction of the bid opportunities for multiple advertising campaigns, the workload is beyond the capacity of a single server; therefore, a collection of machines is required to evaluate and respond to the volume of bid opportunities. A RTB control system is required to intelligently manage collections of advertisement servers.

RTB auctions require a response within 50-100 milliseconds for a bid to be considered; otherwise, the response is discarded. The time is measured from the exchange's location; therefore, latency is subtracted from the available analysis time. To reduce the intrinsic latency issues, bidders are placed physically close to the exchanges. Since exchanges are located around the world, bidders must be distributed around the world. A RTB control system has to manage bidders that are widely distributed geographically.

For many campaigns, advertisers need to use multiple publishers to reach campaign delivery goals, such as the number of impressions, to deliver within targeting criteria. For example, an advertiser may seek to deliver 100,000 impressions per day to women aged 30 to 45. Since each publisher markets its available impressions through a subset of the RTB exchanges, advertisers are required to integrate with multiple exchanges to deliver each campaign. The RTB control system is required to exercise consolidated campaign delivery control across multiple exchanges.

SUMMARY

A method and system for controlling real-time bidding for online advertisements is disclosed. According to one embodiment, a computer-implemented method comprises receiving a real-time bidding (RTB) request from a bidder. The RTB request contains a campaign target. An online advertisement campaign corresponding to the RTB request is placed. Campaign performance data is received from an impression server and/or an event server. The campaign performance data is compared to the campaign target. Based on the result of comparison, it is determined whether to enable or disable the online advertisement campaign.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
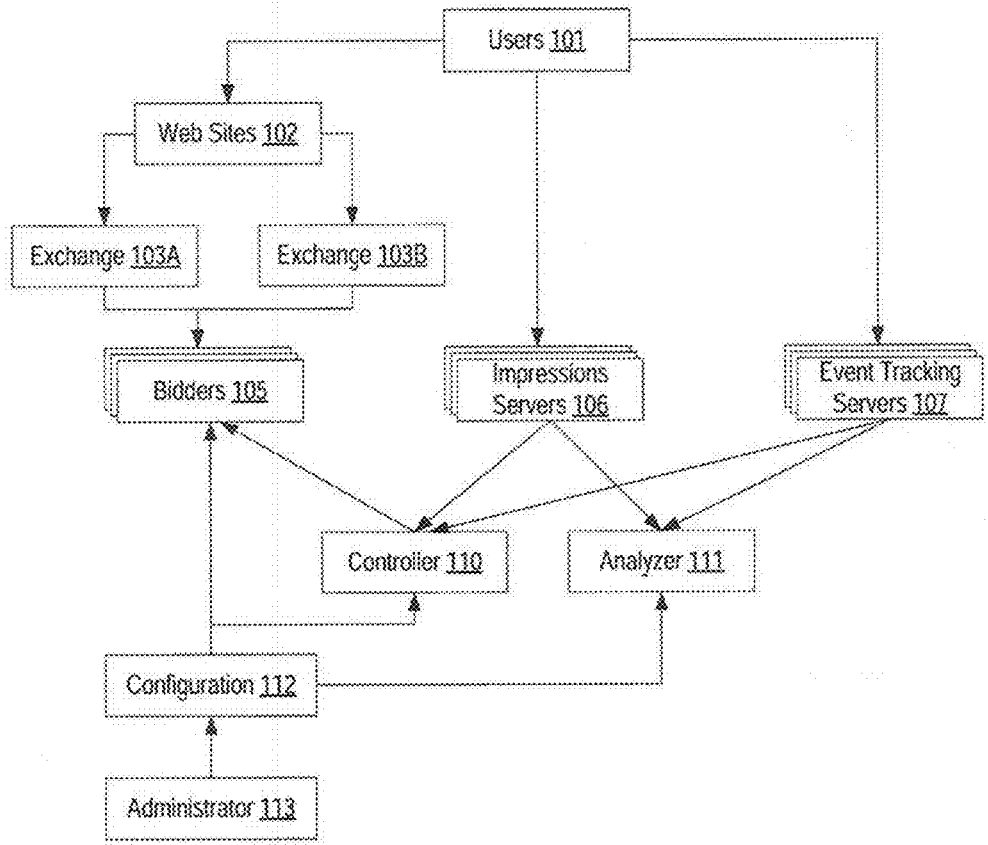
FIG. 1 is a schematic diagram that illustrates a process for controlling real-time bidding for online advertisements, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for controlling real-time bidding for online advertisements is disclosed. According to one embodiment, a computer-implemented method comprises receiving a real-time bidding (RTB) request from a bidder. The RTB request contains a campaign target. An online advertisement campaign corresponding to the RTB request is placed. Campaign performance data is received from an impression server and/or an event server. The campaign performance data is compared to the campaign target. Based on the result of comparison, it is determined whether to enable or disable the online advertisement campaign.

When a bid is successful, the exchange directs the user's browser to display content by returning a URL pointing to an impression server. The user's browser then accesses the impression server to either retrieve an ad or get redirected to the ad content. A winning bid at the auction is indicated by the user's browser accessing the impression server. When the user takes an action, the event is sent to an event tracker. In a stateless bidding system, bidders are unaware whether their bids successfully won impressions or whether the user took any action with respect to their bidding ads. The bidders are also unaware whether other bidders have won the impressions they failed to win. The control system gathers this information and notifies bidders whether they should continue bidding for impressions.

Not all events delivered to the impression server are legitimate for ad delivery to users. In some cases, duplicate requests may be generated. Some impressions are generated for testing purposes. Web crawlers retrieve URL content for analysis. Similar issues occur when monitoring other metrics such as mouse clicks, ad expansion, and video starts. Therefore, analysis is required to remove false data. The control system must manage bidders intelligently with imperfect knowledge about the current state of the overall bidding system.

Each impression for winning a bid incurs a cost. While each impression is inexpensive, there are many thousands of impressions available for each second. Therefore, an RTB control system has to respond rapidly to stop bidding once the impression target is met; otherwise, the purchaser may spend a great deal of money buying more impressions than contracted with their client. This overage is a cost to the purchaser, and it cannot be passed along to clients.

Advertising contracts specify a minimum number of impressions to be served. If the supplier is unable to deliver the required impressions, the advertiser may enforce penalties. The RTB control system has to guarantee that the minimum impressions are delivered while minimizing the overage cost.

An RTB control system is a critical component of a complex infrastructure. The RTB control system must coordinate a distributed collection of stateless bidders that operate across multiple campaigns and exchanges. The RTB control system is required to respond quickly and accurately to achieve the committed goals without causing bidders excessive overage costs even when only insufficient information is available.

The present system and method disclosed herein allows advertisers to bid on advertisement requests across multiple RTB exchanges in a coordinated manner while reaching the target goals of multiple advertising campaigns.

DEFINITIONS

Administrator—a person who sets the desired system behavior.

Analyzer—a system that removes false data gathered by impression servers, event trackers and other components.

Bidder—a system designed to respond to opportunities advertised by RTB exchanges.

Event Tracker—a system to monitor user events such as mouse clicks, ad expansion, video start, video end, etc.

Configuration—a desired system behavior and supplemental information required to achieve the system behavior such as targeting information, pricing, lists of crawlers and test clients.

Controller—a system to control bidding on the various exchanges.

Impression—a system designed to deliver content when notified of winning bids.

It is noted that the present systems are logical systems such that a single piece of hardware can support multiple tasks or multiple pieces of hardware may be required to perform the logical function.

FIG. 1 is a schematic diagram that illustrates a process for controlling real-time bidding for online advertisements, according to one embodiment. Each bidder 105 is connected to one or more RTB exchanges 103 to compete for available impressions for delivery to users 101. These bidders are physically located near the target RTB exchanges' 103 calling servers to reduce network latency. Each available impression is compared against the currently active campaigns to determine whether to attempt to purchase that impression. Control system 110 is responsible for enabling/disabling bidding on campaigns running across multiple bidders 105 and adjusting campaign parameters such as the bid price as required in order to reach the target impression or event quota.

For performance and scalability, the present system and method employ a stateless architecture. In a stateless architecture, the server responds to requests without exchanging information with other systems and/or servers. Each bidder loads information about campaigns that it is executing on the specific RTB exchanges. This information includes campaign parameters such as web domains, content filters, and pricing information. Since the bidders have the information they need to respond to requests, they quickly respond to the requests. Additional bidders can be deployed as required since they operate independently. With this stateless design, each bidder achieves desired performance, and the number of bidders can be increased for scalability.

While this stateless architecture is good for scalability, it introduces a dependency on control system 110 to regulate the bidders 105. Each bidder 105 is unaware of how many impressions have been served for the campaign, how many other bidders 105 are engaged on the campaign, which exchanges are used to deliver the campaign, or whether any bid is successful. Controller 110 monitors campaign delivery to decide whether to enable or disable each campaign on each bidder 105.

Bidders 105 rely on the controller 110 for direction on which campaigns should be enabled or disabled. Controller 110 defines a desired behavior if the control system fails or loses the ability to communicate with the bidders 106. Each bidder 105 continues to bid on impressions indefinitely. This represents a potentially unlimited expenditure for acquiring impressions; therefore, bidders 105 require a backup system to limit their potential expenditures. In a preferred embodiment, bidders 105 default to disable all bidding. The controller 110 periodically sets a timer on the bidder 105 to allow bidding during a bidder-configurable time, for example, ten minutes through a messaging protocol. If the bidder 105 does not hear from the controller 110 before the timer expires, the bidder 105 disables the campaign. The controller 110 re-enables the campaign with the next control message.

When a bid is won through an auction, impression servers 106 provide content or instructions on how to retrieve the content. When users 101 take an action such as clicking on an ad or starting a video, that information is sent to event tracking servers 107. Impressions server 106 and event tracking server 107 maintain information about users' actions for each campaign.

Bidders 105 spend money for each auction that they win. With many thousands of auctions available each second, the cost of bidding quickly adds up. The controller 110 manages bidding quickly and accurately to meet committed impression goals while avoiding buying unnecessary impressions.

Controller 110 gathers configuration parameters 112 about campaigns. Controller 110 analyzes information from impressions servers 106 and event tracking servers 107 to roughly monitor campaign performance for bidders 105, impression servers 106, and event tracking servers 107. This provides a quick estimate of campaign performance regardless of exchange or location that is used to determine whether to continue bidding on campaigns. Instructions are sent immediately to each bidder 106 to enforce the bidding decisions.

According to one embodiment, impression servers 106 and event tracking servers 107 maintain in a cache a number of impressions and events for each campaign. The cache is kept small; impression servers 106 maintain only campaign IDs and impression counts, and event tracking servers 107 maintain the campaign ID and various event counts. Since the data is not stored to a disk, the counts are updated quickly when new impressions are served or events are triggered. The data is quickly retrievable when needed because it is stored in a cache.

According to one embodiment, the controller 110 queries current campaign performance in real-time directly from the impression servers 106 and event tracking servers 107 using web services. Web services provide a low-overhead, standards-based, reliable mechanism to retrieve data over a Wide Area Network (WAN), allowing impression servers 106 and event tracking servers 107 to be located anywhere on the network. The controller 110 aggregates the data and compares the result to the campaign target. When the campaign target is reached, the controller 110 uses web services to notify bidders 105 which campaigns are to be started, continued or stopped. This approach limits the cost overages due to buying unnecessary impressions.

The cache is cleared when the bidder 105 or event tracker is restarted, however, it is not necessarily cleared at a specific time. Therefore, the real-time controller 110 computes the change in impressions and events from one query to the next and detects when a restart has occurred. A restart is detected by comparing the current counter value to the previous value. If the new value is less than the previous value, a reset has occurred. Since there is no way to determine the counter at the time of the reset, the current counter value is the best estimate for the difference since the last time the counter was read. If a reset has not occurred, the difference is the current value minus the previous value. To determine campaign performance for the day, the difference values since midnight are summed.

According to one embodiment, the controller 110 compares daily performance to the daily target performance. If the daily target is reached, the controller 110 uses web services to send a message to the bidder 105 to stop the campaign. To conserve a bandwidth, commands for multiple campaigns are packed into a single message and incremental updates are sent to bidders 105 when possible. An incremental update message contains only the time to continue bidding, a list of campaigns to start, continue, or stop, and a checksum. Each bidder 105 creates a temporary list of campaigns that are to be enabled and calculates a checksum on the list. If the calculated checksum matches the checksum in the message, the bidder 105 replaces its current list of enabled campaigns with the updated list and sets its bidding expiration time to the value in the message. Regardless whether the checksums match, the bidder 105 returns a message with its calculated checksum. The controller 110 compares the returned checksum to the checksum that the bidder 105 sent. If the values do not match, the controller 110 transmits a full list of campaigns and the current state of each campaign. The full list is required on the rare conditions when the entire list has changed or the bidder 106 and controller 110 are out of sync.

According to one embodiment, each bidder 105 maintains a copy of enabled campaigns and their configuration information on each campaign. The configuration information is used to execute on an exchange for sending a bid request to the bidder 106. The configuration information contains a great deal of information including allowable domains, target prices, and supported ad sizes, etc. At a startup, the bidder 105 loads the current campaign configurations, but leaves the list of enabled campaigns empty. The first message from the controller 110 results in a mismatch between the enabled campaign list on the bidder 105 and the controller 110. The controller 110 detects the mismatch using checksums and performs a full update on the enabled campaign list. Since the configuration is pre-loaded on the bidder 106, campaigns can be enabled and disabled quickly in response to messages from the controller 110.

Web crawlers, system tests, and duplicate events generate false impressions and events. All these actions are reported to impression servers 106, event tracking servers 107, and other components of the control system 110. Analyzer 111 gathers and scrubs impression and event information across bidders 105, impression servers 106, and event tracking servers 107 to remove false data and to correctly assess campaign performance. The analysis to clean false data may require some time to complete. For example, a web crawler might be detected by examining traffic patterns in log files over time across impression servers 106. Multiple clicks by a single user can also be detected by analyzing a combined set of log files. Once these types of issues are detected, adjustments are made to the delivery statistics of the campaign. Since these data are not immediately available, control system 110 works with imperfect information, at least temporarily. The present controller architecture operates with the information available at the time of analysis, and then adjusts as more data becomes available.

Controller 110 uses the adjusted information received from analyzer 111 to improve the initial estimate of the number of impressions and events delivered for each campaign. Based on the adjusted information, controller 110 may resume or suspend bidding on various campaigns to reach the target. In this way, controller 110 reacts quickly to manage bidding based on the best information available at the time and then issues corrections as more information becomes available. Campaign targets are reliably reached without resorting to measures such as buying large quantities of surplus impressions as a hedge against false data. This approach achieves the targets while minimizing overhead due to unbillable impressions.

According to one embodiment, the present system and method is scalable to control high auction volume across multiple exchanges and locations in a coordinated and consistent manner. Waste is reduced by pausing campaigns quickly once targets are approximately reached. Ad delivery is fine-tuned as more accurate information is available to ensure correct campaign delivery. Web services are used to provide fast yet reliable notification across a widely distributed collection of bidding servers. Log files are gathered and examined to fine tune performance with adjustments applied using web services.

Figure 2:
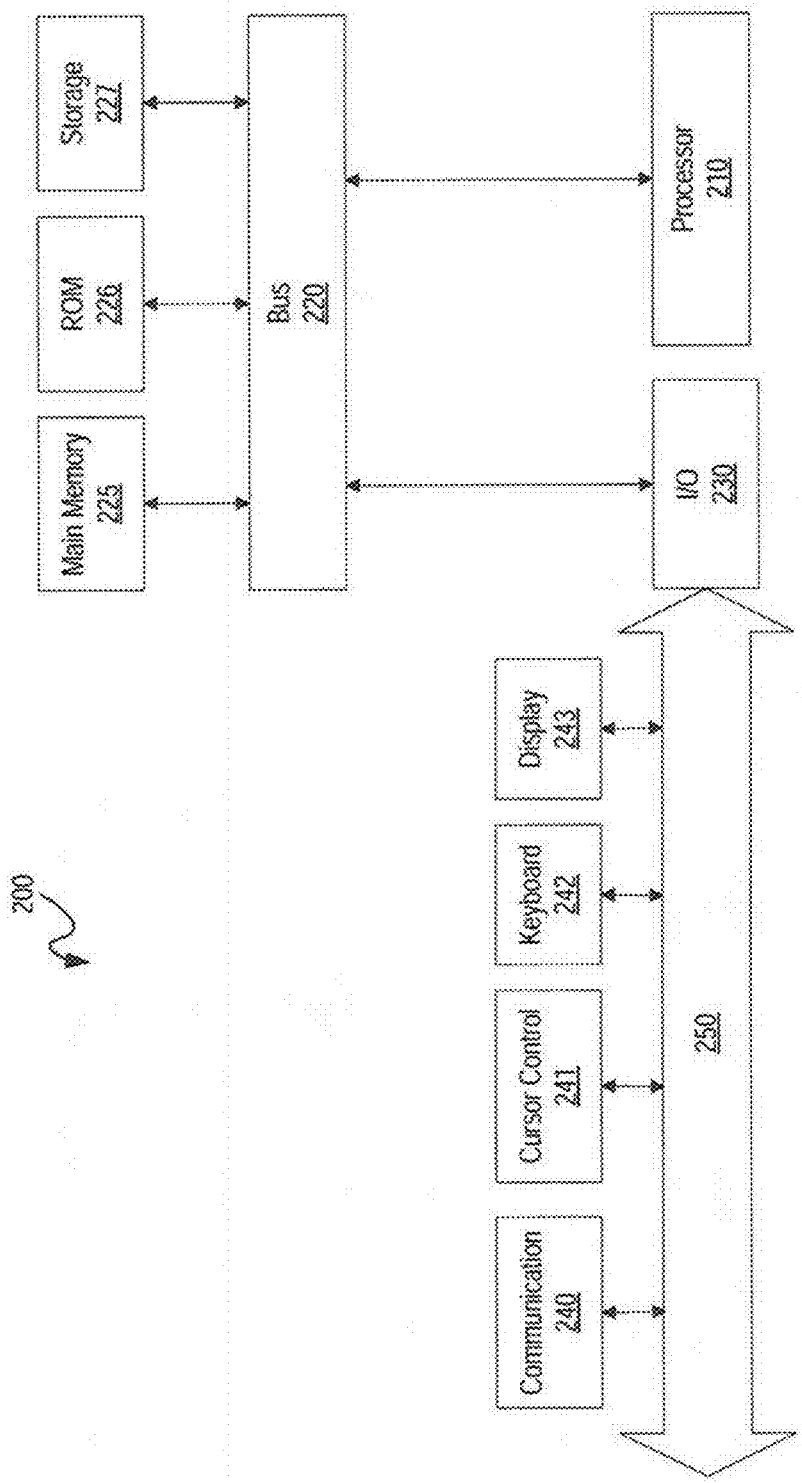
FIG. 2 illustrates an exemplary computer architecture that may be used for the present system, according to one embodiment.

FIG. 2 illustrates an exemplary computer architecture that may be used for the present system, according to one embodiment. The exemplary computer architecture may be used for implementing one or more components described in the present disclosure including, but not limited to, the present system. One embodiment of architecture 200 comprises a system bus 220 for communicating information, and a processor 210 coupled to bus 220 for processing information. Architecture 200 further comprises a random access memory (RAM) 225 (referred to herein as main memory) or other dynamic storage device 227, coupled to bus 220 for storing information and instructions to be executed by processor 210. Main memory 225 also may be used for storing temporary variables or other intermediate information during execution of instructions by processor 210. Architecture 200 may also include a read only memory (ROM) and/or other static storage device 226 coupled to bus 220 for storing static information and instructions used by processor 210.

A data storage device 227 such as a magnetic disk or optical disc and its corresponding drive may also be coupled to architecture 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). The communication device 240 allows for access to other computers (e.g., servers or clients) via a network. The communication device 240 may comprise one or more modems, network interface cards, wireless network interfaces or other interface devices, such as those used for coupling to Ethernet, token ring, or other types of networks.

Figure 3:
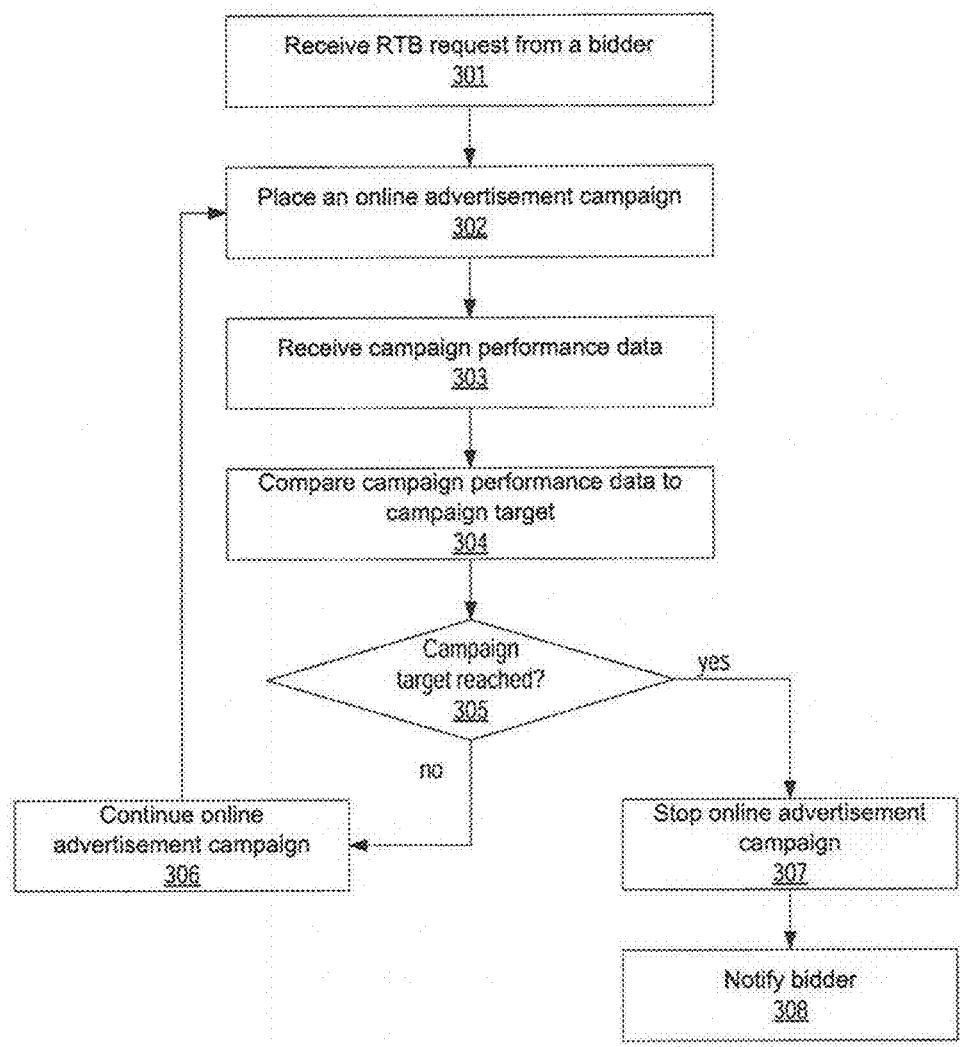
FIG. 3 illustrates an exemplary process for placing an online advertisement campaign, according to one embodiment.

FIG. 3 illustrates an exemplary process for placing an online advertisement campaign, according to one embodiment. Controller 110 receives a real-time bidding (RTB) request from a bidder 105 (301). The RTB request containing a campaign target. Controller 110 places an online advertisement campaign corresponding to the RTB request to available web sites 102 via exchange servers 103 (302).

The campaign performance data is generated by impressions servers 106 and/or event tracking servers 107 and is reported to controller 110 (303). Controller 110 keeps monitoring the real-time campaign performance of the online advertisement campaign using the campaign performance data. Controller 110 compares the campaign performance data to the campaign target (304), and determines whether to enable or disable the online advertisement campaign based on the result of the comparison (305). If the campaign target is reached, controller 110 stops the online advertisement campaign (307) and notifies the bidder 105 (308). If the campaign target is not yet reached, controller 110 continues to place the online advertisement campaign (306).

A system and method for controlling real-time bidding for online advertisements has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method for automated control of bidding on online impressions in an automated real-time online auction system during the loading or rendering of network-based digital content, comprising:

for each of a plurality of campaigns for purchasing online impressions:
  receiving, at a control system, at least one campaign target associated with the respective campaign;
  communicating campaign parameters associated with the respective campaign from the control system to a plurality of geographically distributed bidding servers associated with a plurality of geographically distributed real-time bidding exchanges, via a communications network;
  wherein each bidding server operates as a stateless device unaware of operational details, enablement, and disablement of each other bidding server;

for each of the geographically distributed, stateless bidding servers, automatically controlling, by the control system, an enabled/disabled status of each of the plurality of campaigns in that bidding server by:
  communicating, by the control system, to at least one of the bidding servers a respective list of enabled campaigns for that bidding server;
  each of the at least one bidding servers receiving the respective list of enabled campaigns for that bidding server, and in response, engaging in real-time bidding for each campaign listed in the respective list of enabled campaigns;
  wherein each bidding server engaging in real-time bidding for each campaign enabled in that bidding server comprises:
    receiving at the respective bidding server from an associated real-time bidding exchange via a network a series of bid requests, each bid request identifying an opportunity to deliver an online impression in digital content being loaded or rendered by an internet-connected device;
    for each received bid request, determining by the respective bidding server, in real-time during the loading or rendering of the respective digital content, whether to submit a bid response based at least on campaign parameters associated with the respective campaign;

performing, by the control system, a campaign performance-based analysis comprising:
for each of at least two of the campaigns:
automatically receiving, at the control system via the communications network, campaign performance data for the respective campaign;
automatically comparing, by the control system, the campaign performance data to the campaign target associated with the respective campaign;
based on the comparison, determining whether to change the enabled/disabled status for the respective campaign in one or more of the bidding servers;
based on the campaign performance-based analysis, communicating, by the control system, to at least one of the bidding servers, a revised list of enabled campaigns for that bidding server;
each of the at least one bidding servers receiving the revised list of enabled campaigns for that bidding server, and in response, each respective bidding server automatically enabling one or more currently disabled campaigns or disabling one or more currently enabled campaigns, wherein automatically disabling a currently enabled campaign comprises the respective bidding server terminating real-time bidding for the currently enabled campaign.

2. The computer-implemented method of claim 1, wherein the campaign performance is monitored using web services with at least one of an impression server and an event tracking server.

3. The computer-implemented method of claim 1, wherein the campaign performance data for a respective campaign comprises impression tracking data that comprises an impression counter that indicates a number of delivered online impressions.

4. The computer-implemented method of claim 1, wherein the campaign performance data for a respective campaign comprises event tracking data that comprises an event counter that indicates a number of predefined user actions related to delivered impressions.

5. The computer-implemented method of claim 1, wherein:
the campaign performance data for a respective campaign comprises at least one of impression tracking data from an impression server and an event tracking data event tracking server;
the impression tracking data comprises an impression counter that indicates a number of delivered online impressions;
the event tracking data comprises an event counter that indicates a number of predefined user actions related to delivered impressions; and
the impression server maintains the impression counter in a first cache and the event tracking server maintains the event counter in a second cache.

6. The computer-implemented method of claim 1, further comprising:
for a particular campaign and a particular bidding server, automatically setting a periodic timer for the particular bidding server allowing the particular bidding server to engage in real-time bidding for the particular campaign during a defined timer period of the periodic timer,
if a bidding continuation signal is received by the particular bidding server from the control system within the defined timer period of the periodic timer, automatically resetting the periodic timer at the end of the defined timer period and continuing to engage in real-time bidding for the particular campaign, and
if the bidding continuation signal is not received by the particular bidding server from the control system within the defined timer period of the periodic timer, automatically disabling the particular campaign in the particular bidding system, thereby causing the particular bidding server to terminate bidding for the particular campaign.

7. The computer-implemented method of claim 1, further comprising communicating, by the control system, an incremental update message to each of the plurality of bidding servers, wherein the incremental update message indicates (a) a time to start, continue, or terminate bidding, (b) a list of campaigns for which to start, continue, or terminate bidding, and (c) a checksum.

8. The computer-implemented method of claim 1, further comprising:
identifying false campaign performance data by examining traffic patterns based on data collected by the impression server; and
updating the campaign performance data based on the identified false campaign performance data.

9. The computer-implemented method of claim 1, wherein each bid request identifies a placement in a webpage being loaded or rendered by a browser of the internet-connected device.

10. A non-transitory computer readable medium having stored thereon computer-readable instructions, which instructions when executed by a processor cause the processor to provide automated control of bidding on online impressions in an automated real-time online auction system during the loading or rendering of network-based digital content by:
for each of a plurality of campaigns for purchasing online impressions:
receiving at least one campaign target associated with the respective campaign;
communicating campaign parameters associated with the respective campaign to a plurality of geographically distributed bidding servers associated with a plurality of geographically distributed real-time bidding exchanges, via a communications network;
wherein each bidding server operates as a stateless device unaware of operational details, enablement, and disablement of each other bidding server;
for each of the geographically distributed, stateless bidding servers, automatically controlling an enabled/disabled status of each of the plurality of campaigns in that bidding server by:
communicating to at least one of the bidding servers a respective list of enabled campaigns for that bidding server;
each of the at least one bidding servers receiving the respective list of enabled campaigns for that bidding server, and in response, engaging in real-time bidding for each campaign listed in the respective list of enabled campaigns;
enabling the plurality of geographically distributed bidding servers to engage in real-time bidding for the campaign, such that each enabled wherein each bidding server engaging in real-time bidding for a respective campaign enabled in that bidding server receives from an associated real-time bidding exchange a series of bid requests to purchase online impressions in digital content being loaded or rendered by an internet-connected device, and determine for each bid request, in real-time during the loading or rendering of the respective digital content, whether to submit a bid response to purchase the respective online impression based at least on campaign parameters associated with the respective campaign;

performing a campaign performance-based analysis comprising:

for each of at least two of the campaigns:
automatically receiving, via the communications network, campaign performance data for the respective campaign;
automatically comparing the campaign performance data to the campaign target associated with the respective campaign; based on the comparison, determining whether to change the enabled/disabled status for the respective campaign in one or more of the bidding servers;

based on the campaign performance-based analysis, communicating to at least one of the bidding servers, a revised list of enabled campaigns for that bidding server;

each of the at least one bidding servers receiving the revised list of enabled campaigns for that bidding server, and in response, each respective bidding server automatically enabling one or more currently disabled campaigns or disabling one or more currently enabled campaigns, wherein automatically disabling a currently enabled campaign comprises the respective bidding server terminating real-time bidding for the currently enabled campaign.

11. The non-transitory computer readable medium of claim 10, wherein the campaign performance is monitored using web services with at least one of an impression server and an event tracking server.

12. The non-transitory computer readable medium of claim 10, wherein the campaign performance data for a respective campaign comprises impression tracking data that comprises an impression counter that indicates a number of delivered online impressions.

13. The non-transitory computer readable medium of claim 10, wherein the campaign performance data for a respective campaign comprises event tracking data that comprises an event counter that indicates a number of predefined user actions related to delivered impressions.

14. The non-transitory computer readable medium of claim 10, wherein:

the campaign performance data for a respective campaign comprises at least one of impression tracking data from an impression server and an event tracking data event tracking server;

the impression tracking data comprises an impression counter that indicates a number of delivered online impressions;

the event tracking data comprises an event counter that indicates a number of predefined user actions related to delivered impressions; and the impression server maintains the impression counter in a first cache and the event tracking server maintains the event counter in a second cache.

15. The non-transitory computer readable medium of claim 10 having further instructions stored thereon computer-readable instructions, which instructions when executed by the processor cause the processor to perform operations comprising:

for a particular campaign and a particular bidding server, automatically setting a periodic timer for the particular bidding server allowing the particular bidding server to engage in real-time bidding for the particular campaign during a defined timer period of the periodic timer, if a bidding continuation signal is received by the particular bidding server from the control system within the defined timer period of the periodic timer, automatically resetting the periodic timer at the end of the defined timer period and continuing to engage in real-time bidding for the particular campaign, and if the bidding continuation signal is not received by the particular bidding server from the control system within the defined timer period of the periodic timer, automatically disabling the particular campaign in the particular bidding system, thereby causing the particular bidding server to terminate bidding for the particular campaign.

16. The non-transitory computer readable medium of claim 10 having further instructions stored thereon computer-readable instructions, which instructions when executed by the processor cause the processor to perform operations comprising:

communicating an incremental update message to each of the plurality of bidding servers, wherein the incremental update message indicates (a) a time to start, continue, or terminate bidding, (b) a list of campaigns for which to start, continue, or terminate bidding, and (c) a checksum.

17. The non-transitory computer readable medium of claim 10 having further instructions stored thereon computer-readable instructions, which instructions when executed by the processor cause the processor to perform operations comprising:

identifying false campaign performance data by examining traffic patterns based on data collected by the impression server; and updating the campaign performance data based on the identified false campaign performance.

18. The non-transitory computer readable medium of claim 10, wherein each bid request identifies a placement in a webpage being loaded or rendered by a browser of the internet-connected device.

* * * * *